United States Patent [19]
Creutz et al.

[11] 3,811,946
[45] May 21, 1974

[54] BATTERY ELECTROLYTE COMPOSITION CONTAINING THE REACTION PRODUCT OF AN AMINE AND AN ALDEHYDE

[75] Inventors: Hans-Gerhard Creutz, Westland; Edward A. Romanowski, Troy; Philip C. Symons, Birmingham, all of Mich.

[73] Assignee: Occidental Energy Development Company, Madison Heights, Mich.

[22] Filed: Nov. 18, 1971

[21] Appl. No.: 200,229

[52] U.S. Cl. .................................. 136/30, 136/155
[51] Int. Cl. .................... H01m 43/02, H01m 43/06
[58] Field of Search ................ 136/6, 30, 154, 155; 204/45, 55 R, 55 Y

[56] References Cited
UNITED STATES PATENTS

| | | | |
|---|---|---|---|
| 2,495,629 | 1/1950 | Chester et al. | 204/55 Y |
| 2,589,209 | 3/1952 | Kardos | 204/55 Y |
| 2,680,712 | 6/1954 | Diggin et al. | 204/55 Y |
| 3,640,771 | 2/1971 | Zito | 136/30 |
| 3,653,965 | 4/1972 | Lee | 136/30 |
| 3,537,959 | 11/1970 | Korpium | 204/55 R |
| 3,540,935 | 11/1970 | Keating et al. | 136/30 |
| 3,655,534 | 4/1972 | Kampe | 204/55 R |

FOREIGN PATENTS OR APPLICATIONS

| | | | |
|---|---|---|---|
| 1,204,807 | 9/1970 | Great Britain | 204/55 R |

Primary Examiner—Donald L. Walton
Attorney, Agent, or Firm—B. F. Claeboe

[57] ABSTRACT

An electrolyte composition for use in an electrical storage device such as a battery, and particularly a rechargeable secondary-type battery, comprising an aqueous solution containing a metal halide and a dendrite reducing amount of a soluble reaction product of an amine and an aldehyde.

2 Claims, No Drawings

BATTERY ELECTROLYTE COMPOSITION CONTAINING THE REACTION PRODUCT OF AN AMINE AND AN ALDEHYDE

BACKGROUND OF THE INVENTION

So-called high energy density (H.E.D.) electric storage devices or batteries are conveniently defined as those which are capable of supplying at least about 50 watt hours of electric power per pound of battery weight. Various structural combinations and/or chemical compositions have heretofore been used or proposed for use as H.E.D. secondary storage batteries which may conveniently be recharged repeatedly and which, due to their compactness and high energy storage capacity, render them eminently adaptable for a wide variety of uses, of which vehicle power supply systems constitute a particularly important application. As far as is known, none of the prior art type secondary electric storage batteries have been entirely satisfactory for one of a number of reasons including the high cost of the materials and/or constructions used, their low energy storage capacity, the excessively long time and/or inefficiency in effecting a recharging thereof, their comparatively short useable operating life, the potential toxicity and danger of the chemical constitutents employed therein, the complex control and/or systems necessary to monitor and control their operation and the like.

A recent breakthrough in the H.E.D. secondary battery art was made by the advent of an electrical storage system utilizing a halogen hydrate in combination with an aqueous electrolyte containing a dissolved metal halide disposed in communicative contact with at least one pair or electrodes, of which the negative electrode is comprised of an oxidizable metal. In accordance with the foregoing system, the halogen hydrate is comsumed during the electrical discharge of the battery accompanied by a progressive consumption of the metallic electrode, thereby forming the corresponding metal halide. The specific details of the foregoing storage battery are described in U.S. Pat. application Ser. No. 50,054, filed June 26, 1970, entitled "Halogen Hydrates," now U.S. Pat. No. 3,713,888, which is owned by the assignee of the present invention. The teachings of the aforementioned U.S. Pat. application are incorporated herein by reference and to which reference is made for further details of a battery system to which the present invention is applicable.

A continuing problem associated with secondary or rechargeable batteries of the types heretofore known, including the H.E.D. battery described in the foregoing pending U.S. Pat. application, is the slow rate at which such batteries must be recharged, in addition to the non-uniform redeposition of metal on the electrode during such recharging processes which, under aggrevated situations, form dendrites and/or nodules bridging the spaces between electrodes and short circuiting the system.

Other problems arise when an additive approach is followed in eliminating dendrite formation. Stability of the additive is needed not only to repeat recycling but also to the environment. One may not be able to use the additives that have previously been used in the electrodeposition of metals, such as zinc because the anodes in a rechargeable system are not consumable as they are in electroplating. During charging of the battery, halogen is evolved which may interfere with the metal plating out. Further the additives may act as an inhibitor to the attack of the metal by the halide as well as an inhibitor of halogen reduction to halide at the cathode. Lastly, it has been found that some additives tend to precipitate or salt out during repeated recharging. An example of such additives are benzotriazole, benzene sulfonamide, toluene sulfonamide, chlorototoluene sulfonamide and thiourea.

The improved electrolyte composition comprising the present invention overcomes the foregoing problems by enabling a recharging of metal halide secondary batteries at a rate practical for normal use and wherein the metal is redeposited during the recharging process in the form of a substantially smooth, dense and adherent metallic deposit, thereby substantially prolonging the useful operating life of such batteries.

SUMMARY OF THE INVENTION

The benefits and advantages of the present invention are achieved by employing a novel electrolyte composition in an electrical storage device or battery having an electrode area containing at least one positive and one negative electrode and a storage area for a halogen hydrate which is disposed in communication with the electrode area. The electrolyte composition preferably comprises an aqueous solution containing a metal halide in which the metallic constituent comprises a metal selected from Group IIB preferably, and the halide constituent comprises a halogen such as chlorine and bromine, as well as mixtures thereof. The metal halide concentration may range from a concentration of about 0.1 percent up to a concentration approaching a saturation of the electrolyte. In addition, the electrolyte contains the reaction product of an amine and an aldehyde which is soluble in the electrolyte and is present in an amount broadly ranging from about 0.001 percent by weight to about 10 percent by weight, and preferably from about 0.005 percent to about 1.0 percent by weight.

The reaction product of an amine and an aldehyde are further characterized as being soluble in the electrolyte solution under the operating temperatures encountered and do not adversely affect the structural components of which the battery is comprised. A particularly satisfactory electrolyte composition comprises an aqueous solution of zinc chloride containing about 0.1 percent by weight of the reaction product of ethylene diamine and glyoxal.

Additional benefits and advantages of the present invention will become apparent upon a reading of the description of the preferred embodiments, taken in conjunction with the specific examples.

DESCRIPTION OF PREFERRED EMBODIMENTS

It will be understood that the concentrations of the several ingredients in the electrolyte as herein described and set forth in the subjoined claims are expressed in terms of percentages by weight, unless expressly indicated otherwise.

The electrolyte broadly comprises a solution containing a dissolved metal halide, the reaction product of an amine and an aldehyde and dissolved and/or entrained halogen gas formed during the charging of the battery. On discharge the electrolyte may contain halogen hydrate or more usually the decomposition products of halogen hydrate, i.e., halogen and water. In addition to the foregoing, other ingredients can be included for providing further controlled variations and changes in the physical and chemical properties of the electrolyte, including modification of the corrosiveness of the electrolyte to the battery components, controlled variations in the electric conductivity of the electrolyte, etc. In the more usual and preferred form, the electrolyte consists essentially of an aqueous solution containing from about 0.1 percent up to a saturated concentration of a metal halide consisting of metals selected from the group consisting of the Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, and the like. Of the foregoing metals, zinc constitutes the most preferred metal, while iron, cobalt, and nickel are preferable to the remaining enumerated metals. The preferred halogen constituents are chlorine and bromine, of which the chlorine salts of the preferred metals are particularly suitable and constitute the preferred embodiment. Particularly satisfactory results are obtained employing aqueous solutions containing zinc chloride as the metal halide in combination with effective dendrite reducing amounts of the reaction product of an amine and an aldehyde.

The concentration of the aqueous metal halide in the electrolyte may vary from an amount as low as about 0.1 percent up to a saturated concentration of a salt. Generally, concentrations of about 5 percent to saturation are used, while concentrations of about 10 percent up to about 50 percent by weight are preferred. In regard to zinc chloride salts, maximum conductivity of the electrolyte occurs at a concentration of about 25 percent by weight and the chlorine hydrate formed during the charging operation occurs at atmospheric pressure. Generally, when zinc chloride is employed as the metal halide, concentrations ranging from about 10 percent to about 35 percent are preferred.

In addition to the metal halide constituent, the electrolyte incorporates an effective dendrite reducing amount of the reaction product of an amine and an aldehyde which, as previously indicated may be present in an amount broadly ranging from about 0.001 percent to about 10 percent, more usually from about 0.005 percent to about 1 percent, and preferably from about 0.05 percent to about 0.5 percent of the electrolyte.

Generally the products are prepared by a condensation reaction wherein the amine and aldehyde are reacted in water heated from about 100°F to about boiling. Since the products are generally water soluble they are present in the solution.

Examples of amines that may be used in the invention are those that are described in U.S. Pat. Nos. 2,680,712; 2,384,300; 2,495,629; and 2,589,209, all of which are hereby incorporated by reference.

More specifically, the amines may be ammonia, primary, or secondary amines such as "aliphatic," aromatic or cyclic amines.

One class of amines correspond to the structure:

$$X - R_1 - NR_2 R_3$$

(I)

wherein X is a halogen such as chloro, bromo, fluoro, or a water solubilizing group;

$R_1$ is an aliphatic or aromatic group such as alkylene of 1 to 12 carbon atoms or phenylene or naphthalene; and $R_2$ and $R_3$ are independently selected from the group consisting of hydrogen or alkyl group of up to 12 carbon atoms preferably up to four carbon atoms, such as methyl, ethyl, propyl, butyl, hexyl, decyl or dodecyl. The alkyl groups may also be substituted by a water solubilizing group or a halogen, such as fluoro, chloro, bromo; the $R_2$ and $R_3$ groups may also combine to form a nitrogen heterocyclic ring of from five to eight atoms per ring. By "water solubilizing group" is meant any polar group which will assist in the solubilization of the molecule in the aqueous electrolyte. Preferred groups are hydroxyl, ether such as alkoxy of up to 12 carbon atoms, polyoxyalkylene, such as polyoxyethylene of up to 1,000 repeating units or polyoxypropylene of up to 50 repeating units, sulfonic, sulfate, nitro, carboxylic acid or its alkyl ester of from one to six carbon atoms; other groups that may be used are amino, phosphoric or phosphate.

Typical aliphatic amines are the mono- or dialkyl (one to 12 carbon atoms) amines. Some specific examples are monomethyl amine, diethyl amine, monoethanol amine, chloro-ethyl amine, hexyl amine, didecyl amine and the like.

The aromatic amines are generally of the phenyl type, such as aniline toluidine (ortho, meta or para), phenylenediamine (preferably para), benzidine and the like.

Cyclic amines that may be employed are those having five to eight atoms per ring and up to four rings, such as pyridine, pyrrolidine, hexamethylenetetramine, piperidine, pyrrole, quinoline, isoquinoline, and the like. These cyclic amines may likewise be used in the Formula I described above for that portion of the molecule corresponding to $-NR_2 R_3$.

A preferred class of amines are the polyamines, i.e., those amines that have more than one nitrogen in the compound and may contain up to four nitrogens. The polyamines are generally of the structure and are primary or secondary amines:

$$R_3 R_2 N-R_4 -NR_2 R_3$$

(II)

wherein $R_2$ and $R_3$ are described above.

$R_4$ is substituted or unsubstituted aliphatic or aromatic group containing up to 12 carbon atoms wherein the substituents are halogen or a water solubilizing group.

Suitable polyamines are the aliphatic alkylene polyamines, such as ethylenediamine, propylenediamine, diethylene triamine, triethylenetetramine, N-hydroxy ethyl ethylenediamine, N, N' Dihydroxyethyl ethylenediamine, 1,3-diamine-2-propanol, and the like.

Of the amines described above, the most preferred are the primary amines wherein two hydrogens are attached to the nitrogen and may be placed in the reaction with the aldehyde to form a schiff base.

The aldehydes that may be employed in the present invention are aliphatic and aromatic aldehydes containing up to 20 carbon atoms. The aldehydes may also be heterocyclic aldehydes containing five to eight atoms per ring.

The aliphatic aldehydes that may be employed in the present invention may contain up to 20 carbon atoms. Examples of such aldehydes are formaldehyde, acetaldehyde, proprionaldehyde, butyraldehyde, valrylaldehyde. The preferred group of aldehydes are those containing up to six carbon atoms.

The aromatic aldehydes are normally phenyl- or naphthaldehyde wherein the aromatic ring is substituted or unsubstituted. The substituted aromatic aldehydes contain a halogen or a water solubilizing group.

The heterocyclic aldehydes that may be employed in the present invention are furfural, furfural sodium bisulfite, anthe like.

The particularly preferred type of aldehydes are the polyaldehydes such as the di-aldehydes of up to 20 carbon atoms, preferably up to six carbon atoms which will react with the di-amines. Examples of such aldehydes are glyoxal, succinaldehyde, glutaraldehyde, adipaldehyde, pimelaldehyde, suberaldehyde, azelaldehyde (1,7-heptane dialdehyde), sebacaldehyde and the like.

The compounds of the present invention are readily prepared in an aqueous system by reacting one mole of the aldehyde to about 1.6 moles of the amine and heating the aqueous mixture in a glass vessel at about 140°F.

The temperature that may be employed in the reaction varies from about 50° to 200°C. The amount of reagents can vary widely from equimolar amounts up to an excess of either reagent that is, from about 1–10:-10–1 moles of amine to aldehyde.

Regardless of the specific chemical composition of the additive of the present invention or mixtures thereof, that can be satisfactorily employed in accordance with the foregoing definitions, it is essential that the compound or mixture of compounds used be soluble in the electrolyte in the specific concentrations required over the temperature range normally encountered during that specific battery use. In addition to the foregoing characteristics, it is also preferred that the additive compound be substantially stable during battery operation to avoid a rapid depletion thereof to levels below that normally required to attain the benefits of the present invention, and preferably to avoid the necessity of frequently of continuously replenishing the additive during the battery charging operation. From a practical standpoint, the stability of such additive compounds should be such in order to enable the battery to undergo one complete charging cycle without requiring a replenishment of the additive compound. Conveniently, a concentrate of the additive compound can be added to the battery electrolyte as a routine practice immediately prior to the initiation of a charging operation. Additive compounds which are of greater stability would, of course, require less frequent replenishment to maintain the concentration thereof within desired limits.

Still another characteristic of the additive compound is that the material itself, as well as its decomposition products, are compatible with the chemical composition of the electrolyte, as well as with the materials of which the battery system is composed. The decomposition products are also preferably of a non-toxic quality in order to minimize any hazards to operating personnel.

A typical cycle of a battery to which the electrolyte composition comprising the present invention is applicable will now be described. The battery comprises a closed system including an electrode area containing at least one positive and one negative electrode. During discharge of the battery, the electrolyte contained in a reservoir is circulated to the electrode area by means of a pump at which entrained halogen gas becomes ionized by receiving electrons from the halogen electrode, while a metal of which the other electrode is comprised enters the electrolyte solution as an ion. The voltage potential between the positive and negative electrode causes current to flow, as may be desired, while replenishment of the halogen gas in the electrolyte is achieved by the consumption of a halogen hydrate stored in the storage zone.

During a charging of the battery, the electrodes are connected to an external source of electrical current with a continued circulation of the electrolyte. A halogen gas is formed at the positive electrode while the metal ions in the electrolyte are deposited on the negative electrode. The elemental halogen gas formed at the positive electrode during recharging is carried by means of the electrolyte to a separation zone in which it is maintained at a sufficiently cool temperature to effect a solidification of the halogen hydrate which is separated from the electrolyte and thereafter stored in a storage zone. The electrolyte from the separation zone is again recirculated into the electrode area for entrainment of additional elemental halogen gas formed during the recharging operation, in addition to supplying additional metallic ions to the negative electrode for deposition thereon. This metallic deposition on the negative electrode is carried out in the presence of such elemental halogen gas which presents particular problems in obtaining a uniform and adherent coating suitable for dissolution during the discharge cycle of the battery. After charging, the negative electrode is comprised of an oxidizable metal.

In order to further illustrate the improved electrolyte composition comprising the present invention, the following specific examples are provided. It will be understood that the examples are merely illustrative of various compositions and concentrations suitable for use in accordance with the practice of the present invention and are not intended to be limiting of the compositions as contemplated herein and as set forth in the subjoined claims.

EXAMPLE I

Into 1 gallon of water was added 0.28 pounds of ethylenediamine and 108 pounds (30 percent) glyoxal. The solution was heated to 140°F in water and the temperature was allowed to rise to 175°F with stirring for about 4 hours. This solution was cooled by allowing to stand and then diluted by the addition of 0.4 gallons of water.

An aqueous electrolyte composition was prepared that contained 35 percent by weight zinc chloride and 100 milligrams per liter of the above glyoxal, ethylenediamine product. A second electrolyte composition was prepared similar to the above except it contained 500 milligrams per liter of the reaction product.

The above electrolyte compositions were individually evaluated employing a test cell containing a pair of substantially inert electrically conductive electrodes, each having a surface area of about 125 sq. centimeters. The electrodes were disposed in spaced substantially parallel face-to-face relationship at a distance of 0.05 inches. One electrode was cathodically charged, while the other was anodically charged at a voltage potential to effect a current density of about 80 amps per foot of electrode area for a period of time up to 2½ hours. During the charging cycle, the electrolyte solution was circulated between the opposed electrode surfaces at a substantially constant flow rate of about 400 milliliters per minute. At the completion of each test, an inspection of the cathodically charged electrode revealed the formation of a substantially smooth, dense and adherent deposit of zinc metal of about 10 – 12 mils in thickness. The quantity of zinc metal deposited is equivalent to a potential storage of electrical energy of about 55 watt hours per square decimeter of electrode area.

Similar tests were conducted employing the same electrolyte but without any of the additive compounds therein. In each instance, a premature termination of the test was occasioned after relatively short charge periods of only about 45 minutes as a result of the formation of dendrites and/or nodules bridging the space between the opposed electrode surfaces, effecting a short circuiting of the test cell. An inspection of the quantity of zinc deposited on the cathodic electrode revealed an amount equivalent to about only 9 watt hours per square decimeter of electrode area.

What is claimed is:

1. An electrolyte composition for use in an electric energy storage device comprising an aqueous zinc halide solution selected from the group consisting of zinc chloride and zinc bromide and an effective dendrite reducing amount of a soluble compound which is the reaction product of glyoxal and ethylenediamine.

2. An electric energy storage device comprising an electrode area having at least one positive and one negative electrode, said negative electrode being comprised of a zinc surface, means for passing a halogen selected from the group consisting of chlorine and bromine into the electrode area and the electrolyte of claim 1 in the electrode area.

* * * * *